US011301980B2

(12) United States Patent
Sakuramoto et al.

(10) Patent No.: US 11,301,980 B2
(45) Date of Patent: Apr. 12, 2022

(54) SYSTEM AND METHOD TO EVALUATE THE INTEGRITY OF SPOT WELDS

(71) Applicant: GM Global Technology Operations LLC, Detroit, MI (US)

(72) Inventors: Carlos Y. Sakuramoto, Sao Paulo (BR); Ningjian Huang, Bingham Farms, MI (US); Fabio Do Monte Sena, São José dos Campos (BR); Adriana Nunes, São José dos Campos (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/854,235

(22) Filed: Apr. 21, 2020

(65) Prior Publication Data

US 2021/0327043 A1 Oct. 21, 2021

(51) Int. Cl.
*G06T 7/00* (2017.01)
*G06N 3/08* (2006.01)
*G06N 3/04* (2006.01)
*H04N 5/225* (2006.01)

(52) U.S. Cl.
CPC ............ *G06T 7/0004* (2013.01); *G06N 3/08* (2013.01); *G06N 3/04* (2013.01); *G06T 2207/10016* (2013.01); *G06T 2207/10024* (2013.01); *G06T 2207/20081* (2013.01); *G06T 2207/20084* (2013.01); *G06T 2207/30108* (2013.01); *G06T 2207/30248* (2013.01); *H04N 5/2252* (2013.01); *H04N 5/2256* (2013.01)

(58) Field of Classification Search
CPC ......... G06T 7/0004; G06T 2207/10024; G06T 2207/10016; G06T 2207/30248; G06T 2207/20084; G06T 2207/20081; G06T 2207/30108; G06N 3/08; G06N 3/04; H04N 5/2252; H04N 5/2256
See application file for complete search history.

(56) References Cited

U.S. PATENT DOCUMENTS

| 5,283,418 | A | * | 2/1994 | Bellows | ............... | B23K 9/0956 |
| | | | | | | 219/130.01 |
| 2003/0234239 | A1 | * | 12/2003 | Lee | ......................... | B23K 11/24 |
| | | | | | | 219/109 |
| 2009/0266989 | A1 | * | 10/2009 | Schwarz | ................ | G01B 11/24 |
| | | | | | | 250/358.1 |

(Continued)

OTHER PUBLICATIONS

Yang, O., et al., "Quality Evaluation and Automatic Classification in Resistance Spot Welding by Analyzing the Weld Image on Metal Bands by Computer Vision," International Journal of Signal Processing, Image Processing and Pattern Recognition, vol. 8, No. 5, pp. 301-314, May 2015.*

*Primary Examiner* — Xuemei G Chen
(74) *Attorney, Agent, or Firm* — Vivacqua Crane PLLC

(57) ABSTRACT

A method to evaluate the integrity of spot welds includes one or more of the following: projecting light from a light source at a spot weld to illuminate the spot weld; capturing an image of the illuminated spot weld with a camera; transmitting information about the image of the illuminated spot weld to a central processing unit (CPU); and evaluating with the CPU the information about the image of the illuminated spot weld coupled with an artificial intelligence neural networked-based algorithm to determine the integrity of the spot weld in real time.

18 Claims, 6 Drawing Sheets

(56) References Cited

U.S. PATENT DOCUMENTS

| | | | |
|---|---|---|---|
| 2011/0023610 A1* | 2/2011 | Ume | G01N 29/4481 |
| | | | 73/622 |
| 2013/0075371 A1* | 3/2013 | De Souza | G01N 25/72 |
| | | | 219/109 |
| 2013/0105556 A1* | 5/2013 | Abell | G05B 1/00 |
| | | | 228/1.1 |
| 2013/0105557 A1* | 5/2013 | Spicer | B23K 20/10 |
| | | | 228/104 |
| 2013/0247672 A1* | 9/2013 | Lev | G01N 3/068 |
| | | | 73/588 |
| 2013/0259376 A1* | 10/2013 | Louban | G06T 7/66 |
| | | | 382/173 |
| 2015/0138320 A1* | 5/2015 | El Daher | G01B 11/2522 |
| | | | 348/46 |
| 2017/0032281 A1* | 2/2017 | Hsu | B23K 31/125 |
| 2017/0200394 A1* | 7/2017 | Albrecht | G09B 9/00 |
| 2017/0343481 A1* | 11/2017 | Jahanshahi | G06T 7/44 |
| 2018/0341248 A1* | 11/2018 | Mehr | B22F 10/00 |
| 2019/0019589 A1* | 1/2019 | Waite | G06T 7/0008 |
| 2019/0287237 A1* | 9/2019 | de Bonfim Gripp | G06T 5/30 |
| 2019/0362855 A1* | 11/2019 | Ma | A61B 6/5217 |
| 2020/0026057 A1* | 1/2020 | Krueger | G06K 9/6289 |
| 2020/0193233 A1* | 6/2020 | Washitani | G06N 20/00 |
| 2020/0234419 A1* | 7/2020 | Ota | G06T 7/001 |
| 2020/0234425 A1* | 7/2020 | Furuichi | G01M 99/00 |
| 2020/0290505 A1* | 9/2020 | Herrmann | B60Q 1/2696 |
| 2020/0357112 A1* | 11/2020 | Sakai | G06T 7/75 |
| 2021/0107082 A1* | 4/2021 | Monjardin | B23K 9/0956 |
| 2021/0142467 A1* | 5/2021 | Burkhardt | G06N 3/08 |
| 2021/0339343 A1* | 11/2021 | Lodewijk Kees | G01N 25/72 |
| 2021/0341451 A1* | 11/2021 | Maiorano | G01N 33/207 |

* cited by examiner

SYSTEM AND METHOD TO EVALUATE THE INTEGRITY OF SPOT WELDS

INTRODUCTION

The present disclosure relates to a system and method to evaluate spot welds. More specifically, the present disclosure relates to a system and method to evaluate spot welds in real time in the manufacturing of motor vehicles.

Many motor vehicle bodies are manufactured by the union of stamped metal components that are joined together primarily by spot welding. For each vehicle, the number of spot welds can vary from around 3000 to more than 5000 depending on the type of vehicle. To evaluate the integrity of these welds, a random sample of the welds are inspected during the manufacturing process, utilizing, for example, chisel or peel tests. If the quality of some of the inspected spot welds are deemed to be below a desired standard, all or some of the welds may be re-spotted (that is, welding the same location again), burned (using more electrical current at the same weld location), which requires increase time and energy, or the welded components are disposed of if the re-spotting or burning the welds is not applicable.

Thus, while current spot welding processes achieve their intended purpose, there is a need for a new and improved system and method for inspecting the integrity of spot welds.

SUMMARY

According to several aspects, a method to evaluate the integrity of spot welds in the manufacturing of motor vehicles includes one or more of the following: projecting light from a light source at a spot weld to illuminate the spot weld; capturing an image of the illuminated spot weld with a camera; transmitting information about the image of the illuminated spot weld to a central processing unit (CPU); and evaluating with the CPU the information about the image of the illuminated spot weld coupled with an artificial intelligence neural networked-based algorithm to determine the integrity of the spot weld in real time.

In an additional aspect of the present disclosure, the neural network-based algorithm includes a training data base that is continuously updated.

In another aspect of the present disclosure, the training data base that is continuously updated is a first input data and the information about the image of the illuminated spot weld is a second input data.

In another aspect of the present disclosure, the first input data includes process and material data, lab test data, sensitivity analysis data and correlation data.

In another aspect of the present disclosure, the sensitivity analysis includes changing one welding parameter while other welding parameters are kept constant and analysis of variations in mechanical and electrical machine setup of a process to produce spot welds.

In another aspect of the present disclosure, the spot weld is illuminated with different patterns, the second input data being a picture image or a video image of the spot weld that is colored or black and white, the picture image or the video image being converted to pixels.

In another aspect of the present disclosure, the camera and the light source are housed in an assembly, each of the camera and the light source being independently movable.

In another aspect of the present disclosure, the assembly is static.

In another aspect of the present disclosure, the assembly is movable by a robot.

In another aspect of the present disclosure, the artificial intelligence neural networked-based algorithm is stored as software in a non-transitory memory system that communicates with the CPU.

According to several aspects, a method to evaluate the integrity of spot welds in the manufacturing of motor vehicles includes one or more of the following: projecting light with different patterns from at least one light source at a spot weld to illuminate the spot weld; capturing an image of the illuminated spot weld with at least one camera; transmitting information about the image of the illuminated spot weld to a central processing unit (CPU); and evaluating with the CPU the information about the image of the illuminated spot weld coupled with an artificial intelligence neural networked-based algorithm to determine the integrity of the spot weld in real time. The neural network-based algorithm includes a training data base that is continuously updated. The training data base that is continuously updated is a first input data and the information about the image of the illuminated spot weld is a second input data.

In another aspect of the present disclosure, the first input data includes process and material data, lab test data, sensitivity analysis data and correlation data.

In another aspect of the present disclosure, the sensitivity analysis includes changing one welding parameter while other welding parameters are kept constant and analysis of variations in mechanical and electrical machine setup of the process to produce spot welds.

In another aspect of the present disclosure, the second input data is a picture image or a video image of the spot weld that is colored or black and white, the picture image or the video image being converted to pixels.

In another aspect of the present disclosure, the at least one camera and the at least one light source are housed in an assembly, each of the at least one camera and the at least one light source being independently movable.

In another aspect of the present disclosure, the artificial intelligence neural networked-based algorithm is stored as software in a non-transitory memory system that communicates with the CPU.

According to several aspects, a system to evaluate the integrity of spot welds in the manufacturing of motor vehicles includes at least one light source that projects light different patterns at a spot weld to illuminate the spot weld, a camera that captures an image of the illuminated spot weld, a central processing unit (CPU) that receives information about the image of the illuminated spot weld. The CPU evaluates the information about the image of the illuminated spot weld coupled with an artificial intelligence neural networked-based algorithm to determine the integrity of the spot weld in real time. The artificial intelligence neural networked-based algorithm is stored as software in a non-transitory memory system that communicates with the CPU. The neural network-based algorithm includes a training data base that is continuously updated. The training data base that is continuously updated is a first input data and the information about the image of the illuminated spot weld is a second input data.

In another aspect of the present disclosure, the first input data includes process and material data, lab test data, sensitivity analysis data and correlation data, the sensitivity analysis including changing one welding parameter while other welding parameters are kept constant and analysis of variations in mechanical and electrical machine setup of the process to produce spot welds.

In another aspect of the present disclosure, the second input data is a picture image or a video image of the spot weld that is colored or black and white, the picture image or the video image being converted to pixels.

In another aspect of the present disclosure, the at least one camera and the at least one light source are housed in an assembly, each of the at least one camera and the at least one light source being independently movable.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
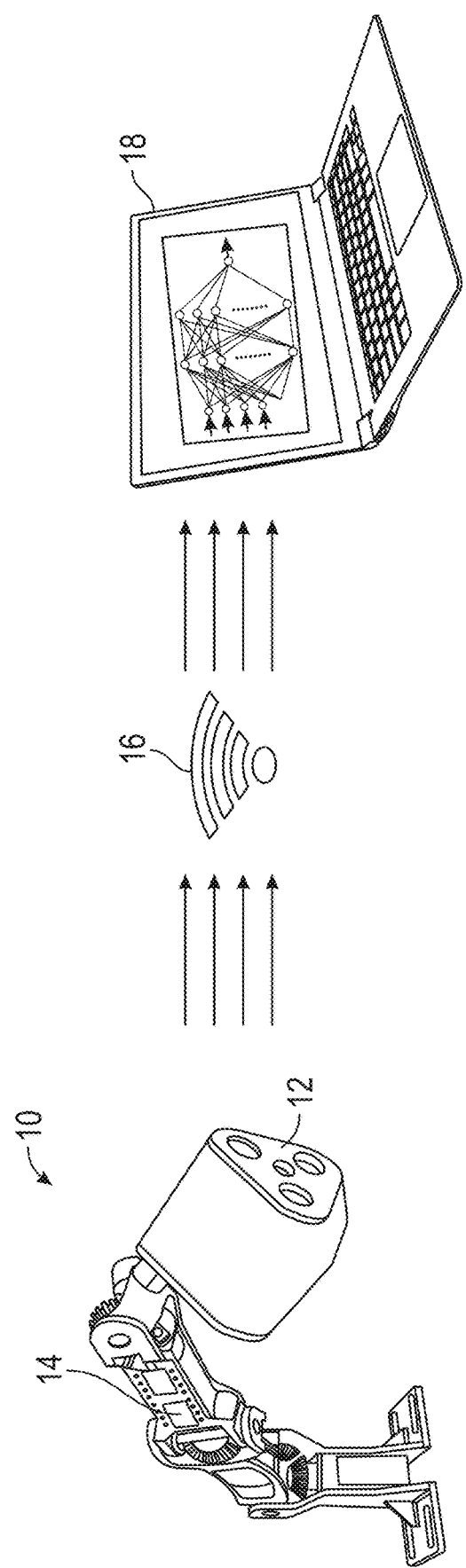
FIGS. 1A and 1B show a system for spot welding components according to an exemplary embodiment.
Figure 1B:
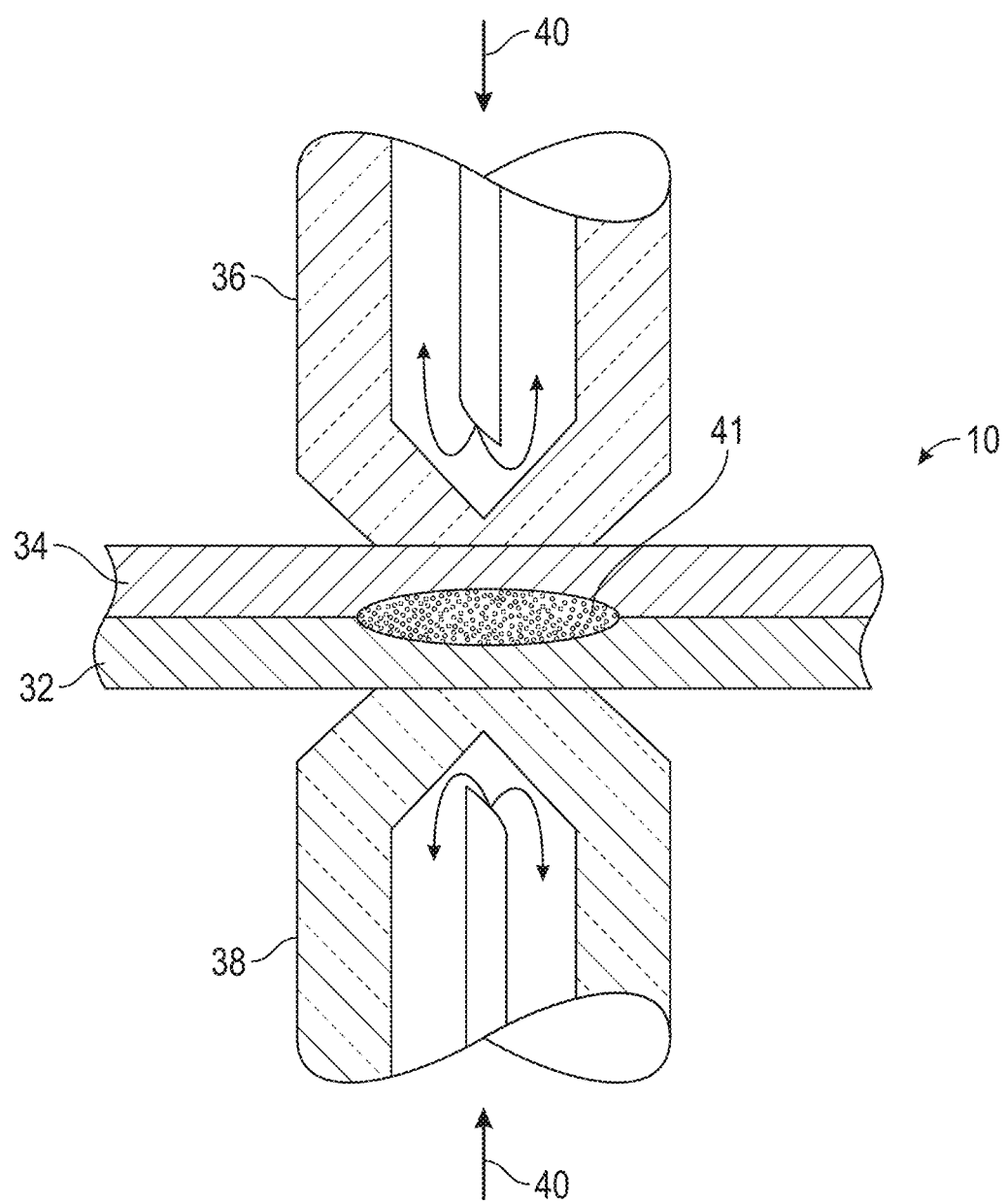

Referring to FIGS. 1A and 1B, there is shown a spot welding system 10 for joining two pieces of conductive metal 32, 34 together with a pair of shaped electrodes 36, 38 in the manufacturing of motor vehicles. Typically, the electrodes 36, 38 are forced together, as indicated by the arrows 40 so that the two pieces of metal 32, 34 are clamped together. The electrodes 36, 38 are typically made of copper alloy and concentrate welding current into a small "spot". A voltage is applied across the electrodes 36, 38 to generate a current through the spot to melt the metal and form a weld 41. The welding process occurs without excessive heating of the remainder of the pieces 32, 34.

Figure 2A:
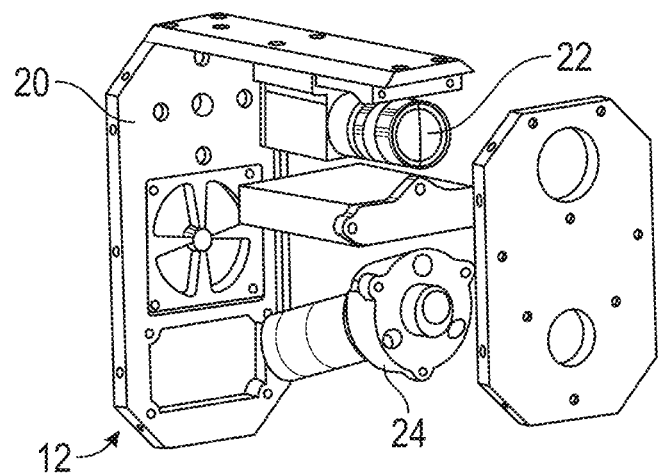
FIG. 2A shows an assembly of a camera and light source for the system shown in FIG. 1A according to an exemplary embodiment.
Figure 2B:
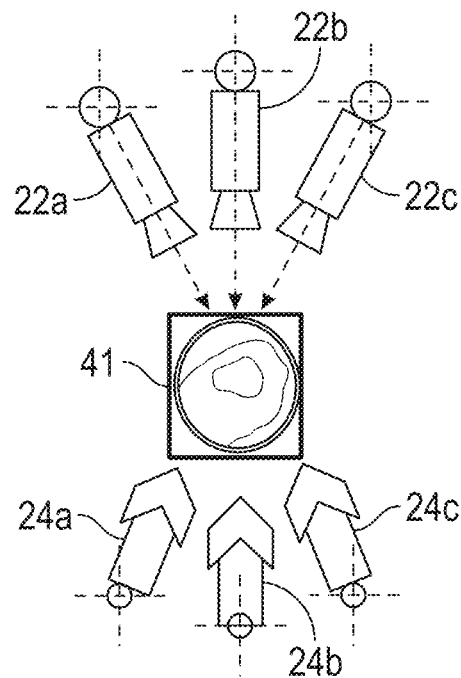
FIG. 2B shows an arrangement with multiple cameras and light sources for the system shown in FIG. 1A according to an exemplary embodiment.
Figure 2C:
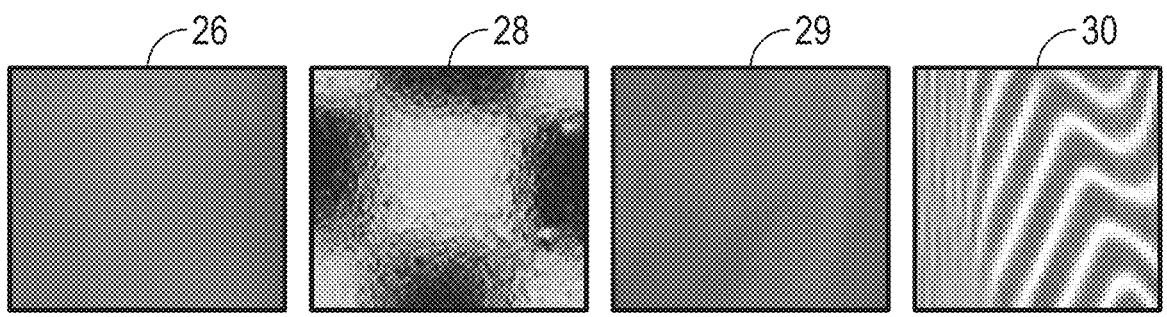
FIG. 2C shows various patterns produced by the light sources shown in FIG. 1A, 2A or 2B according to an exemplary embodiment.

Referring back to FIG. 1A and to FIGS. 2A, 2B and 2C the system 10 is able to evaluate the integrity of the weld 42 by utilizing an assembly 12 with at least one light source 24 and at least one camera 22 contained in a housing 20. The camera 22 captures color images of the weld 41 in some arrangements and black and white images of the weld 41 in other arrangements. The light source 24 is capable of projecting different colors and patterns 26, 28, 29, 30 (FIG. 2C) on the weld 41 to illuminate the weld 41. The assembly 12 is static in some implementations and is movable in other implementations by, for example, a robotic arm 14. In certain arrangements as shown, for example, in FIG. 2B, multiple light sources 24a, 24b, 24c that are able to move independently of each other are utilized to project light onto the weld 41, and multiple cameras 22a, 22b, 22c that are able to move independently of each other are utilized to capture images of the illuminated weld 41.

Data regarding the captured images are transmitted through a cable or wirelessly 16 to a computer 18, which includes a digital central processing unit (CPU) in communication with a memory system and an interface bus. The CPU is configured to execute instructions stored as a program in the memory system and send and receive signals to/from the interface bus. The memory system may include various non-transitory, computer-readable storage medium including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout the steps of the processes described below to control the spot welding system 10.

A program stored in the computer 18 is transmitted from outside via a cable or in a wireless fashion. It is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature. The computer 18 further includes a graphical display that translates data and user requests into graphical representations of desired information.

Figure 4:
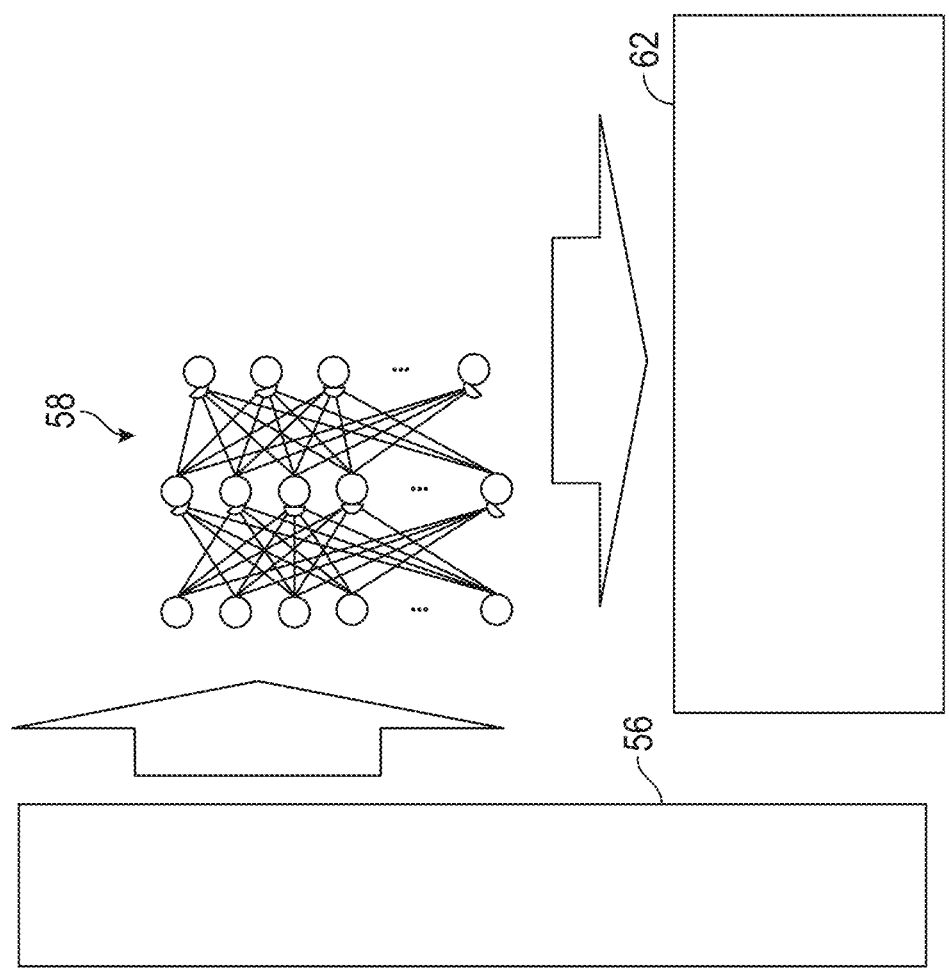
FIG. 4 shows the incorporation of input data to evaluate the integrity of spot welds with the system shown in FIGS. 1A and 1B according to an exemplary embodiment.
Figure 4:
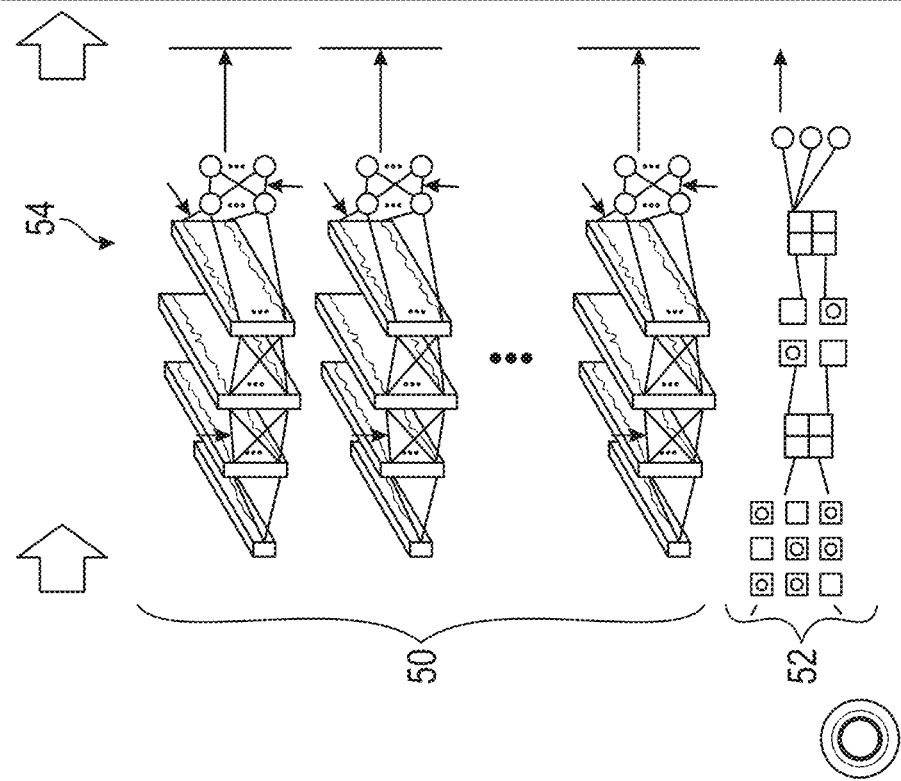

In various implementations, the computer program stored in the computer 18 includes a neural network-based algorithm. Referring to FIG. 4, the computer 18 receives input data 1 (50) and images or pictures captured by the camera as input data 2 (52) or analysis with the neural network-based algorithm. The same type of measurement or characterization of input data 2 (5) that is extracted during the inspection process are also conducted in lab data that composes the training data base. Input data 2 (50) can be features extracted from various data processing of images or temporal series, or even the raw image or temporal series. Temporal series can have different physical natures, such as the dynamic resistance cure or the refrigerant fluid temperature curve in the cape of the electrodes (36,38) During the inspection process, input data 2, in certain implementations, is utilized to update the data base to train new neural network-based models.

Figure 3:
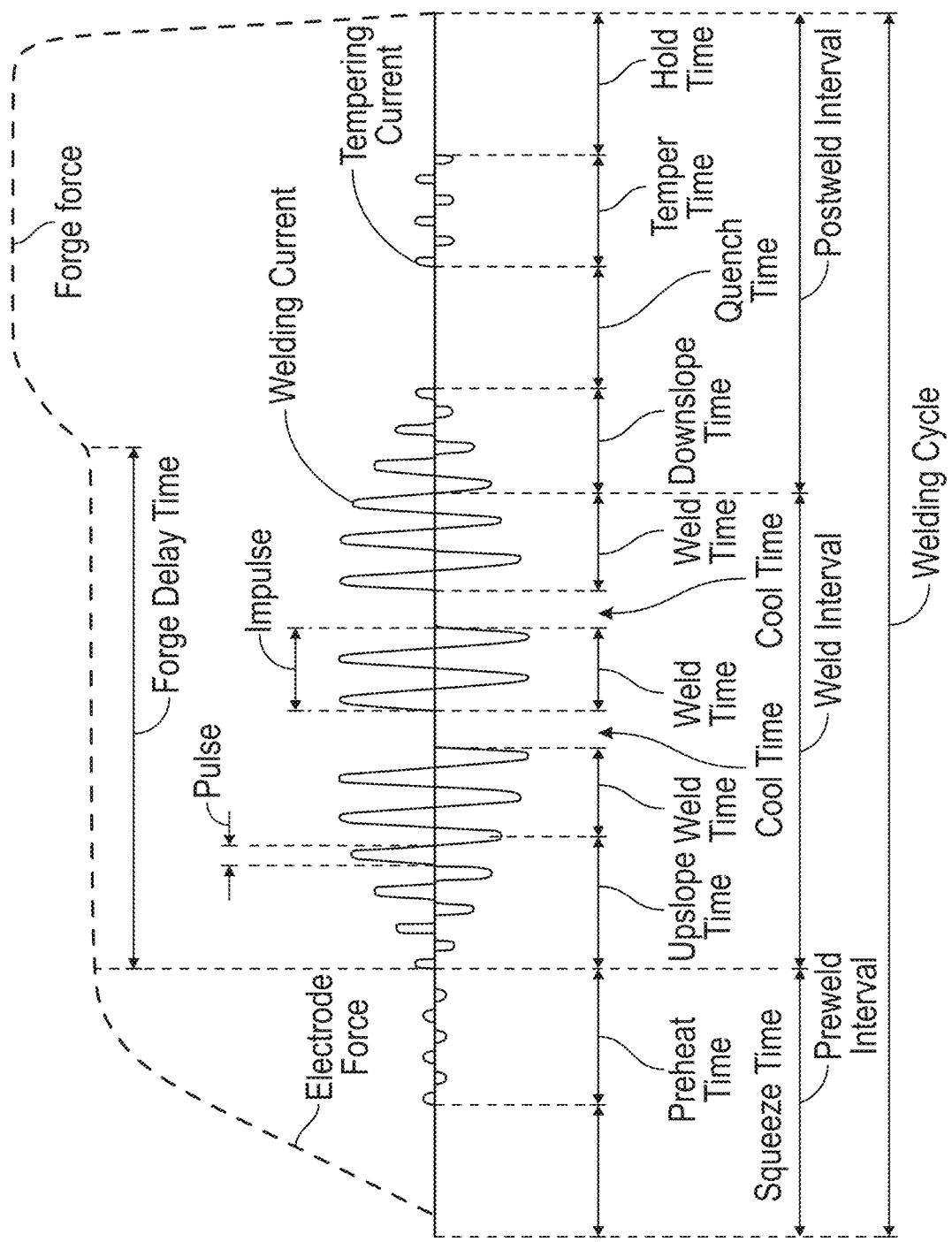
FIG. 3 shows various welding parameters for the system shown in FIGS. 1A and 1B according to an exemplary embodiment.

Input data 1 (50) incudes, for example, an artificial intelligence training data base that is continuously updated. The training data base includes process parameter variations, as shown in FIG. 3, lab test data, sensitivity analysis data and correlation data of the spot weld input data, such as, for example, diameter, max indentation depth, heat affected zone, radius standard deviation, amount of brass in defined area and amount of brass in detected circle. The raw image or temporal series itself without features extraction can also be utilized as correlation data. Various methods for the correlation include, for example, binarization codes to evaluate the diameter and radius standard deviation, cyber to evaluate the max indentation depth, counting pixel software to evaluate the heat affected zone and yellowness detection codes to evaluate the amount of brass in the defined area and the amount of brass in the detected circle. More specifically, correlations for image processing concern the extraction of 2D data from the surface of a spot weld in terms of morphology (radius standard deviation, diameter, heat affected zone size etc.) by binarization computer programs and color (amount of brass and other interesting color contrasts on surface regions) by counting pixels programs. The use of image filters (adaptative, entropy etc.) methods helps to achieve such characterizations. Further note that cyber is a brand of a chromatic aberration microscope. This equipment extracts a 3D data (x,y,z) of the spot welding surface, which allows the measurement of indentation and others topologic features. In various implementations, other three-dimensionalization approaches are utilized.

Lab test data may include spot welds characterized by peel tests, tensile-shear tests, microhardness map, metallographic analysis etc. Input data 1 (50) in various implementations include other additional information that is not acquired during the spot weld inspection process. Such additional information is utilized to classify a spot weld in a group of interest (cold weld or suitable weld, determining is an electrode cape is good or bad etc.). Sensitivity analysis in various implementations include the analysis of the variations in the mechanical and electrical machine setup of the spot welding process, such as, for example, the wear of the electrode capes, the electrical nature of the process (low, medium or high frequency) etc.

The neural networked-based algorithm correlates the different parameters from input data 1 (50) and input data 2 (52) with multivariate analysis, which allows for real time and online inspection of the weld 41. Further, in certain implementations, raw images or raw temporal series are utilized as input data, and the main combination is dependable on the interest inference (quality, maintenance issue, etc.).

The neural networked-based algorithm performs a feature extraction and analysis 54 on input data 1 (50) and, then, a concatenation layer and analysis 56 on input data 1 (50) and input data 2 (52) to generate predictive information. Next in a decision layer 58, the neural networked-based algorithm determines various failure modes and suitable modes for the weld to establish causes and effects 62. These causes and effects provide, for example, current, ideal and optimized welding parameters, predictive analysis, predictive maintenance, predictive optimization, predictive final behavior of joined parts, a signature of the joined parts. This information further uploaded to a data server.

Figure 5:
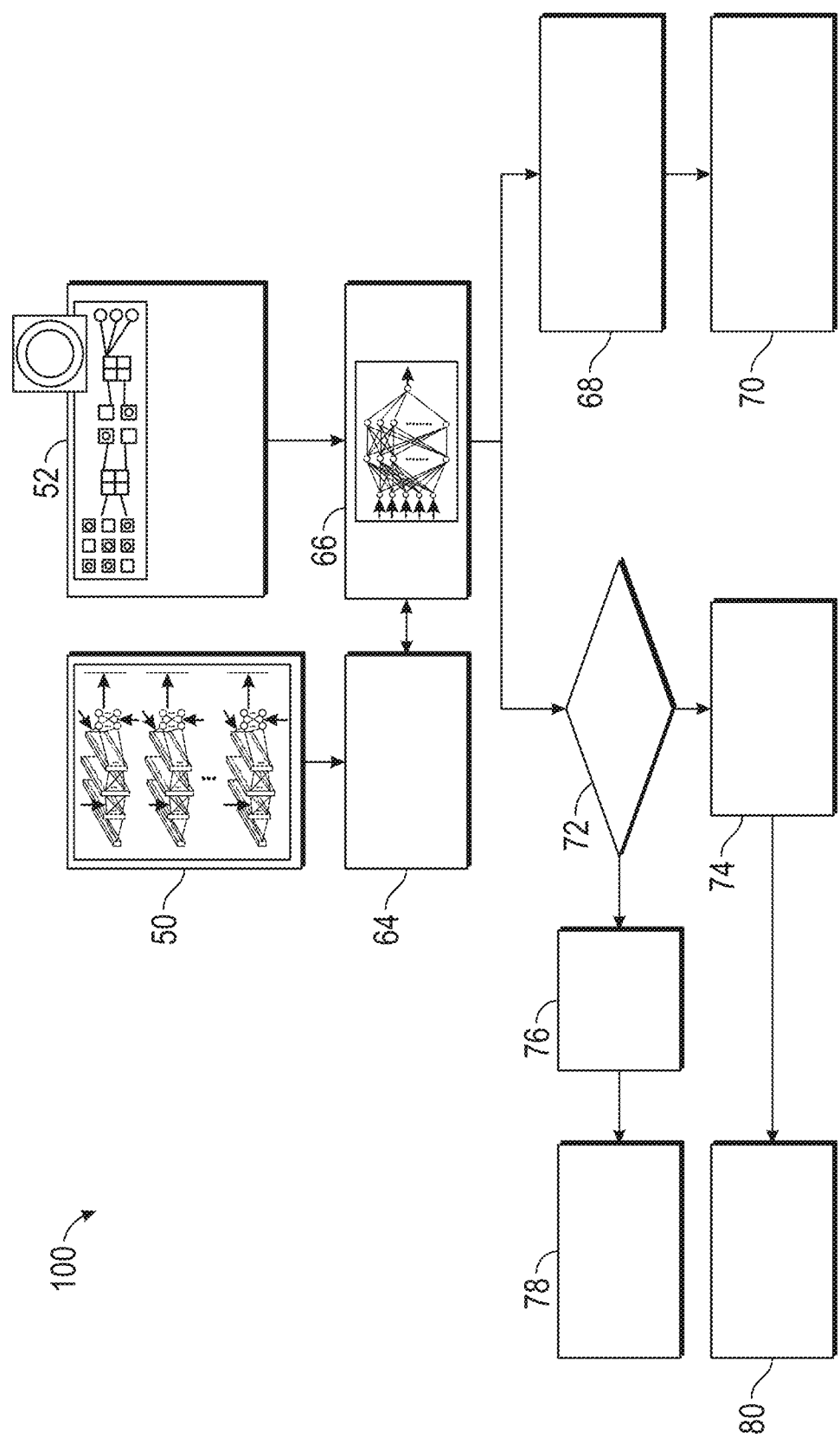
FIG. 5 shows a flow diagram of a process to evaluate the integrity of spot welds with the system shown in FIGS. 1A and 1B according to an exemplary embodiment.

Referring now to FIG. 5, there is shown a process 100 that incorporates that aforementioned features of the neural networked-based algorithm described previously. The process 100 begins with input data 1 (50) being transmitted to the training data base 64. Feature extraction based on characteristics identified in the multivariate factor analysis is performed on the input data 2 (52). The training base data 64 and the analysis of input data 2 (52) is evaluated by the networked-based algorithm 66.

Next at step 68, the process 100 determines if the weld is safe. If the weld is safe, the process 100 determines in step 70 that the welding process 10 can proceed. In some cases, decision step 72 receives information from step 66 and determines that there is a maintenance issue of the welding process 10 in step 74 that requires a corrective action in step 80, so that even with a maintenance issue, the process 100 still produces suitable welds. In other cases, decision step 72 determines there is a quality issue of the weld itself at step 76 that is remedied with a corrective step 78.

In various implementations, the spot welding system 10 includes multiple light and camera assemblies 12, each of which is capable of housing one or more light sources 24 and one or more cameras 22. The spot welding system 10 is capable of evaluating thousands of spot welds in real time during the manufacturing of motor vehicles.

The spot welding system 10 includes several benefits and advantages. For example, the spot welding system 10 incorporates a computer-based vision system, artificial intelligence with machine learning to inspect and evaluate 100% of the spot welds during the manufacturing of a motor vehicle. Further, the spot welding system 10 is able to predict the root cause of any type of spot weld defects before the defect occurs utilizing an image of the spot weld.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to evaluate the integrity of spot welds, the method comprising:
projecting light from a light source at a spot weld to illuminate the spot weld;
capturing an image of the illuminated spot weld with a camera;
transmitting information about the image of the illuminated spot weld to a central processing unit (CPU);
evaluating with the CPU the information about the image of the illuminated spot weld coupled with an artificial intelligence neural network-based algorithm to determine the integrity of the spot weld in real time, the neural network-based algorithm including a training data base that is continuously updated, the training data base that is continuously updated being a first input data and the information about the image of the illuminated spot weld being a second input data, and
wherein the first input data includes process and material data, lab test data, sensitivity analysis data and correlation data, and wherein the sensitivity analysis includes changing one welding parameter while other welding parameters are kept constant and analysis of variations in mechanical and electrical machine setup of the process to produce spot welds.

2. The method of claim 1, wherein the spot weld is illuminated with different patterns, the second input data being a picture image or a video image of the spot weld that is colored or black and white, the picture image or the video image being converted to pixels.

3. The method of claim 1, wherein the camera and the light source are housed in an assembly, each of the camera and the light source being independently movable.

4. The method of claim 3, wherein the assembly is static.

5. The method of claim 3, wherein the assembly is movable by a robot.

6. The method of claim 1, wherein the artificial intelligence neural networked-based algorithm is stored as software in a non-transitory memory system that communicates with the CPU.

7. The method of claim 1 further comprising performing a corrective action in response to results of evaluating with the CPU.

8. The method of claim 7, wherein the corrective action is performed so that even with a maintenance issue a suitable weld is produced.

9. A method to evaluate the integrity of spot welds, the method comprising:
projecting light with different patterns from at least one light source at a spot weld to illuminate the spot weld;

capturing an image of the illuminated spot weld with at least one camera;

transmitting information about the image of the illuminated spot weld to a central processing unit (CPU);

evaluating with the CPU the information about the image of the illuminated spot weld coupled with an artificial intelligence neural network-based algorithm to determine the integrity of the spot weld in real time, the neural network-based algorithm including a training data base that is continuously updated, the training data base that is continuously updated being a first input data and the information about the image of the illuminated spot weld being a second input data; and performing a corrective action in response to results of evaluating with the CPU, wherein the first input data includes process and material data, lab test data, sensitivity analysis data and correlation data.

10. The method of claim 9, wherein the sensitivity analysis includes changing one welding parameter while other welding parameters are kept constant and analysis of variations in mechanical and electrical machine setup of the process to produce spot welds.

11. The method of claim 9, wherein the second input data is a picture image or a video image of the spot weld that is colored or black and white, the picture image or the video image being converted to pixels.

12. The method of claim 9, wherein the at least one camera and the at least one light source are housed in an assembly, each of the at least one camera and the at least one light source being independently movable.

13. The method of claim 9, wherein the artificial intelligence neural network-based algorithm is stored as software in a non-transitory memory system that communicates with the CPU.

14. The method of claim 9, wherein the corrective action is performed so that even with a maintenance issue a suitable weld is produced.

15. A system to evaluate the integrity of spot welds, the system comprising:

at least one light source that projects light with different patterns at a spot weld to illuminate the spot weld;

a camera that captures an image of the illuminated spot weld; and a central processing unit (CPU) that receives information about the image of the illuminated spot weld, wherein the CPU evaluates the information about the image of the illuminated spot weld coupled with an artificial intelligence neural network-based algorithm to determine the integrity of the spot weld in real time, the artificial intelligence neural network-based algorithm being stored as software in a non-transitory memory system that communicates with the CPU, and wherein the neural network-based algorithm includes a training data base that is continuously updated, the training data base that is continuously updated being a first input data and the information about the image of the illuminated spot weld being a second input data, and wherein the first input data includes process and material data, lab test data, sensitivity analysis data and correlation data, the sensitivity analysis including changing one welding parameter while other welding parameters are kept constant and analysis of variations in the mechanical and electrical machine setup of the process to produce spot welds.

16. The system of claim 15, wherein the second input data is a picture image or a video image of the spot weld that is colored or black and white, the picture image or the video image being converted to pixels.

17. The system of claim 15, wherein the at least one camera and the at least one light source are housed in an assembly, each of the at least one camera and the at least one light source being independently movable.

18. The system of claim 15 further comprising performing a corrective action in response to results of evaluating with the CPU.

* * * * *